United States Patent Office 3,101,025
Patented Aug. 20, 1963

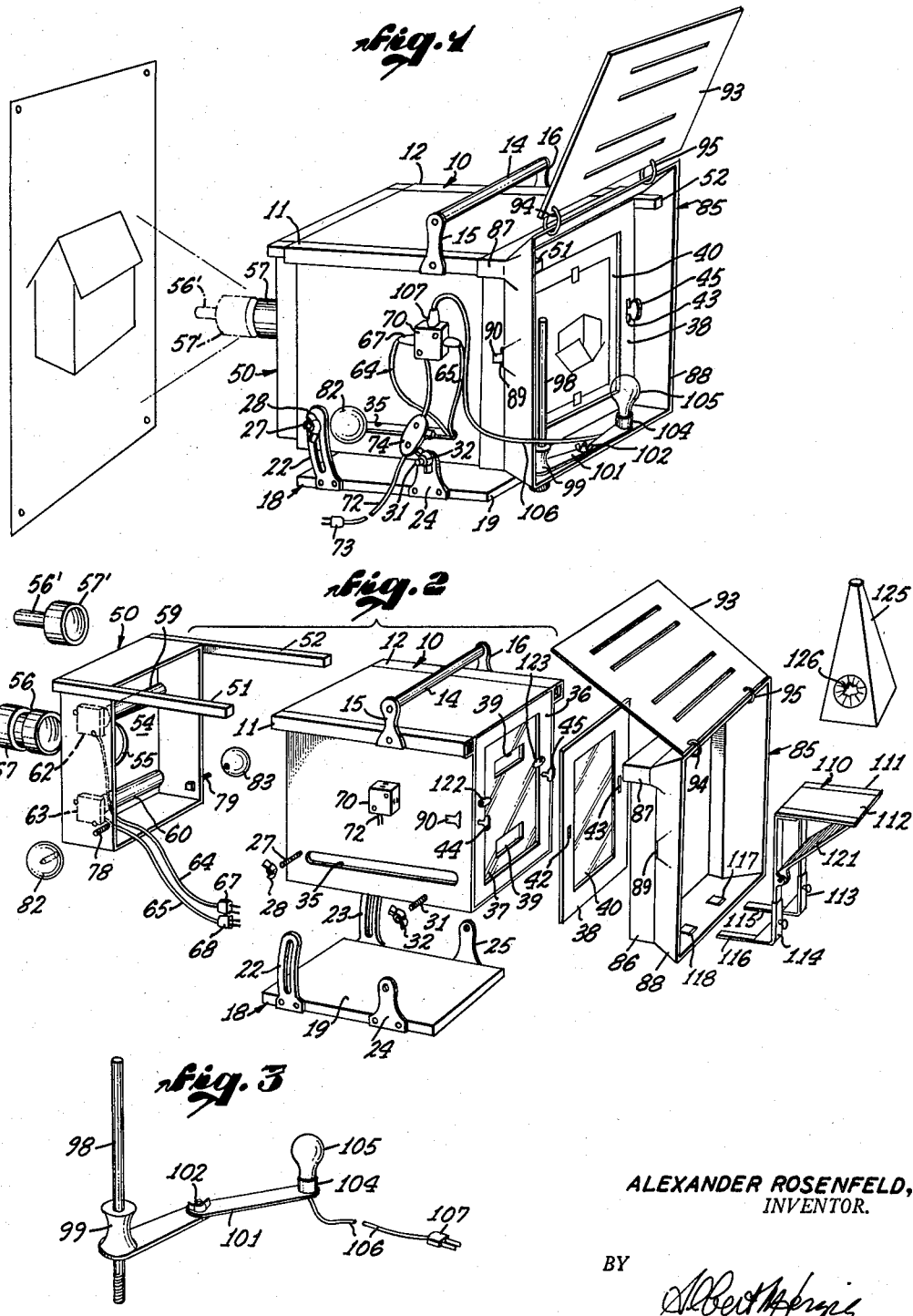

3,101,025
COMBINED OPTICAL REPRODUCER AND PROJECTOR
Alexander Rosenfeld, 3345 Blair Drive, Hollywood 28, Calif.
Filed Dec. 9, 1960, Ser. No. 74,840
1 Claim. (Cl. 88—24)

This invention relates to a combined optical reproducer and projector. The invention provides a device whereby an image of any two-dimensional or three-dimensional object or thing may be projected upon a surface and then very simply reproduced in any size simply by tracing. With the same apparatus, the image so reproduced may be projected to any surface and magnified to any desired size or on the other hand, reduced if desired. When the object or thing is reproduced, after being traced as described, it may then be re-traced if desired, for example, with charcoal in magnified or reduced size.

The apparatus and the method associated therewith are applicable to virtually any two-dimensional or three-dimensional object or thing such as opaque sketches, writings, graphic works, prints, photos, etc. and three-dimensional objects. With the apparatus, black and white images or color can be projected and reproduced as well as the traced, or existing transparencies.

The reproducer and projector of the invention is intended for use commercially and otherwise such as in the field of signs, posters and illustration generally. It is also adapted for use by various types of craftsmen as well as professionals such as engineers, machine designers, map and plan makers, etc. It has very marked utility and advantage in the field of commercial art and related fields.

The invention in a preferred form is a compact, unitary device or apparatus whereby an image of any object or a thing, two dimensional, or three dimensional may be reflected or projected onto a surface and then traced onto a suitable material such as paper. This having been done, the image thus traced may be projected by the apparatus through a lens onto a screen or onto any surface and magnified (or reduced) to any desired size as thus projected. The device is of a simplified nature providing the necessary adjustments whereby the image may be reflected and projected for tracing and for projecting or reprojecting onto a surface. The apparatus in a preferred form embodies a compact, unitary telescoping construction comprising a main housing having a sliding or telescoping front chamber carrying a lens and a rear hood and attached flap also having telescoping arrangement with the main chamber so that maximum compactness can be realized for convenient portability and lightness in weight.

The primary object of the invention is to provide an improved combined optical reproducer and projector whereby in a single unit, an image of any object or thing may be projected and reproduced such as by tracing and then reprojected in any desired magnified size or in reduced size if desired.

Another object is to provide an apparatus as in the foregoing object comprising a main housing or chamber having a sliding or telescoping front part carrying a lens, means forming a surface upon which an image may be projected and traced and a rear hood telescopically associated with the main housing or chamber.

Another object is to provide an apparatus as in the foregoing having suitable means for illumination provided within the housing of the apparatus and exterior thereto for purposes of reproducing images on a surface, tracing them, and then reprojecting them onto a surface outside of the apparatus. A corollary of this object is to provide means for projecting images of three-dimensional objects, opaques as well as transparencies, and things too large to fit within the apparatus.

Further objects and numerous additional advantages of the invention will become apparent from the following detailed description and annexed drawings, wherein:

FIG. 1 is a perspective view of a preferred form of the invention;

FIG. 2 is an exploded view showing the various parts of the invention separated from each other; and FIG. 3 is a detail view of the rear lamp and support.

Referring now more in detail to the various figures of the drawings, numeral 10 designates the main housing or chamber of the reproducer and projector. The main housing is rectilinear in configuration as shown. At the upper edge of the sides, it is provided with two channel forming members 11 and 12 which are square in cross-section and which have a purpose which will be described presently. Numeral 14 designates a carrying handle extending across the top of the main chamber and supported by brackets 15 and 16.

Numeral 18 designates a stand or platform which is provided for the apparatus and which provides for adjustment of the angle of the line of sight of the device as will be described. The stand includes a flat base 19 having upstanding arcuate slotted brackets 22 and 23 and also the two brackets 24 and 25. The brackets 22 and 23 engage with screws such as the screw 27 extending from a side of the main housing of the device. These screws engage in the slots in the brackets 22 and 23 and the brackets may then be held in a fixed angular position by setting up wing nuts as shown at 28. The brackets 24 and 25 have apertures which fit over additional screws extending from the sides of the main housing as shown at 31 and the housing may be held relative to these brackets by setting up wing nuts on these screws such as the wing nut as shown at 32. Screws 31 are along a central axis of housing 10 allowing tilting of the device about this axis to accommodate it to similarly tilted canvases or screens being viewed or projected on.

Provided in the lower part of each side of the main housing is an elongated slot as indicated at 35 for a purpose which will be presently described.

In the rear end of the main housing, there is fitted a frame 36 which frames a panel 37 of glass or plastic. Numeral 38 designates a similar removable frame which frames another panel 40 of glass or plastic. The frame 38 has slots on opposite sides as designated at 42 and 43 which can fit over thumb screws 44 and 45 extending out from the sides of the frame 36. When the openings 42 and 43 are fitted over these thumb screws and they are then turned, the frame 38 is held onto the end of the device adjacent to the frame 36. Panel 37 has two cutouts 39, the purpose of which will be described presently.

Numeral 50 designates a sliding chamber which forms the front part of the device or unit. This chamber is a box-like unit of rectilinear configuration having vertical and horizontal dimensions corresponding to those of the main chamber 10. At the upper part of its sides, it has a pair of rearwardly extending square bars 51 and 52 adapted to telescope into and slide within the channels 11 and 12. The sliding chamber 50 has a front face 54 in which is an aperture 55 which receives the magnifying lens 56. Preferably, the lens is made of a small inexpensive magnifying glass inserted in a tube which is then installed into a larger tube 57 that fits into the aperture 55 in the sliding chamber 50. This provides three focusing adjustments (i.e.), the sliding box 50, the tube 57 in aperture 55 and lens 56 within tube 57. Numeral 56' designates a reducing lens formed by two small magnifying lens in a holder fitting in tube 57' which fits in aperture 55. Additionally, the lens tubes are reversible in apertures 55 for further focusing adjustment.

Within the sliding chamber 50 are lamps 59 and 60 on bases 62 and 63 attached to the inside of one of the side walls of the sliding chamber. These lamps are connected by cords 64 and 65 to plugs 67 and 68 which may be plugged into a plug receiver or block 70 on the side of the main chamber 10. Power for lamps or lights may be supplied through a cord 72 having a plug 73 on the end thereof and having interposed in it a manually operable button switch 74.

The sliding chamber 50 telescopes into the inside of the main chamber 10 as may be seen in FIG. 1. It has screws 78 and 79 extending outwardly from its opposite sides which engage in the elongated slots as shown at 35. Numerals 82 and 83 designate spherical members which screw onto the screws 78 and 79 for holding the sliding chamber 50 in any adjusted telescopic position.

Numeral 85 designates generally the rear hood and flap which is of rectilinear configuration and is of a size to telescopingly fit over the outside of the main chamber 10. The hood has a rectilinear part 86 which is enlarged at the upper part as shown at 87 to fit over the channel members 11 and 12. The rectilinear part 86 has extending therefrom the hood 88 comprised of top, bottom and side members which flare outwardly in the manner shown in the figures. The outwardly flared side members have openings such as shown at 89 to receive brackets such as shown at 90 on the main chamber 10 so that the parts accurately fit and are held together.

Numeral 93 designates a flap hinged to the top edge of the hood by way of rings 94 and 95 so that the flap can be swung down to close or cover the open end of the hood. Flap 93 has ventilating openings or slots as shown, this device requiring no cooling system being very compact and having all the equipment within the box. Nevertheless, it is capable of infinite magnification and reduction both in producing and projecting.

Preferably the hood 125 is made collapsible diamondwise for portability.

Upstanding from the bottom flared member of the hood is a post 98 having a vertically slidable member or fitting 99 mounted on it. Extending from the fitting 99 is a two part centrally joined bracket or arm 101, the two parts of which are adjustably held together by a screw and wing nut 102. On the end of this arm or bracket is a fitting or receptacle 104 for a light or lamp 105 which is supplied with power through a cord 106 having a plug 107 also plugged in the receptacle 70. The fitting 99 is removable and may be packed inside the housing 10.

Numeral 110 designates generally a side-up tracer for reproducing images on a horizontal surface and tracing them in a horizontal plane. This device or attachment comprises a frame 111 framing a panel of glass or plastic 112 which is supported by brackets or legs 113 and 114 having inwardly extending portions 115 and 116. These portions may be received in slots or openings 117 and 118 in the bottom transverse member of the hood 85 for holding the attachment in position. The attachment includes a reflector member 121 positioned at substantially a 45° angle and extending upwardly and outwardly from the legs 113 and 114 and below the panel 112. As will be described, images reflected or projected to the reflector 121 are in turn projected or reflected upwardly to appear on the panel 112. This attachment is especially for use with live objects since the image appears unreversed on panel 112 facilitating tracing.

When an image of any object is to be reproduced, the back flap of the device is lifted and rested on top of the housing against the handle 14. A piece of tracing paper such as onion skin is attached to the panel 40 of the frame 38 by means of Scotch tape. The apparatus is of course assembled at this time as shown in FIG. 1. It is then trained on a desired object which is brought into focus by loosening the knobs 82 and 83 and adjusting the sliding chamber 50 relative to the main chamber 10. Additionally the lens 56 may be adjusted in or out by adjusting tube 57 in aperture 55, it also being a telescopic tube, the lens being slidable within tube 57. In operating indoors, any two-dimensional object is placed on an easel or wall at appropriate height upside-down and is well lighted by window or artificial light for purposes of reflecting and reproducing the image within the apparatus. Indoors, ordinarily, a 100 watt lamp will suffice. The main housing of the apparatus may then be adjusted angularly by means of the wing nuts 28 and 32 and adjusting relative to the arcuate brackets 22 and 23. When clarity has been realized, knobs 82 and 83 may be again set up. Perfect focusing can be achieved by the adjustments previously described. An image of the object being viewed is projected onto the screen, that is, the panel 40 within the frame 38 and may be viewed directly thereon. It may be traced onto the tracing paper preferably using a ball point pen or dark pencil. Frame 38 may then be detached from frame 36 by turning the thumb screws 44 and 45 to a position where they can pass through the slots 42 and 43. The tracing is removed and placed between frames 36 and 38 and frame 38 is again attached, that is, fastened by turning the thumb screws 44 and 45 to a horizontal position. The rear light or lamp 105 is then plugged into the receptacle and with flap 93 down, the tracing may then be projected to any desired size and if desired, may then be retracted with charcoal or the like.

With reference to opaques or three-dimensional objects, the same process is followed in projecting except that the lamps 59 and 60 in the sliding chamber 50 are used instead of the rear lamp 105. The cut-outs 39 in panel 37 prevent images of lamps 59 and 60 themselves from being projected. Three-dimensional objects may be placed within housing 10 for purpose of projecting any part of said object to be projected. Large objects or graphic art objects or any part thereof may be projected from a position behind the apparatus.

Since the image projects from left to right, there being no mirrors tracing or lightweight paper is used and the charcoal retracing serves as carbon by turning the said retracing around. That is, the charcoal retracing with image reversed can be turned around and the charcoal retracing rubbed on to the canvas or artwork with the image then not reversed. Placement can thus be easily modified. However, since the original tracing is transparent, it can be reversed at the start. Also, opaques can be outlined with ink on tracing paper (overlaid) if one desires to draw the projection directly on working surfaces.

The glass or panel in the frame 36 may be made removable by being held in place by small fixtures such as shown at 122 and 123. Frames 36 and 38 may be removed when projecting an object from behind the apparatus.

The side-up tracer 110 is used for dealing with live subjects or any other if so desired, as pointed out above. When using the side-up tracer for live objects, the dark hood 125 is used, this item having an opening as shown at 126 for inserting the hand for tracing in sunlight. The hood 125 has an eye aperture at the top which the operator looks through while tracing.

From the foregoing, those skilled in the art will observe that the invention provides a portable, lightweight, inexpensive "camera" device or apparatus by means of which an image of any object, drawing or picture or other graphic art can be easily enlarged or reduced for reproduction by tracing and projected on any surface such as a canvas, transparent plate glass, or other suitable surface to allow sharp detail retracing by hand. The device does not require photographic aid and eliminates reproduction by conventional methods of developing positive and negative prints for an enlarged and/or reduced image as desired. The device incorporates in one unit an enlarger, reducer, and tracer shadow box which can be easily set into open or closed position for indoor or outdoor use by artists and many other persons in many crafts and professions. The device provides a facility which has not previously been available in fields exemplified by the field of commercial art. That is, the device is capable of providing infinite magnification and reduction of art work, for example, with great clarity of detail. Images may be quickly and inexpensively reproduced, projected and reproduced (retraced) in any size and accurately positioned in any background of prepared art work. This has not heretofore been possible.

The device is completely self-contained (i.e.), all the equipment is within it, requires no cooling system and is adjustable to any angle on its platform. The device is characterized by simplicity of construction and the use of minimum parts which allows low cost of manufacture and production and further, the device is one which requires virtually no maintenance.

The foregoing disclosure is representative of a preferred form of the invention and is to be interpreted in an illustrative rather than a limiting sense, the invention to be accorded the full scope of the claim appended hereto.

What is claimed is:

A combined image reproducer, tracer, and projector comprising a housing having front aperture means adapted to receive rays from an object to be reproduced and having image reproducing means therein, said housing having a transparent panel at the back in a position to have reproduced thereon an image transmitted through said image producing means, means for attaching paper or the like to said panel whereby said image may be traced on the paper, said housing being provided with first illumination means in back of said panel whereby the image on said panel may be reprojected through said image producing means onto a screen or the like, said housing, including a telescoping front part carrying said image producing means, and second illumination means, said housing being configurated to provide space therein to have three dimensional objects placed therein, said telescoping front part and said second illumination means providing for focusing of said image producing means and adjusting said illumination means whereby an image of such three dimensional object can be projected, said first and second illumination means being selectively operable, said second illumination means comprising at least one lamp, said transparent panel having at least one cutout aligned with the second illumination means to prevent reflection from said transparent means of illumination from said lamp directed onto said image producing means.

References Cited in the file of this patent

UNITED STATES PATENTS

| | | |
|---|---|---|
| Re. 2,311 | Woodward | July 10, 1866 |
| 735,697 | Beebe et al. | Aug. 11, 1903 |
| 883,895 | Lieghley | Apr. 7, 1908 |
| 1,928,757 | Klasey | Oct. 3, 1933 |